United States Patent

Iida et al.

[11] Patent Number: 6,009,851
[45] Date of Patent: *Jan. 4, 2000

[54] IDLE SPEED CONTROL APPARATUS FOR AN INTERNAL COMBUSTION ENGINE

[75] Inventors: Kazumasa Iida, Kyoto; Katsuhiko Miyamoto, Funai-gun, both of Japan

[73] Assignee: Mitsubishi Jidosha Kogyo Kabushiki Kaisha, Tokyo, Japan

[*] Notice: This patent is subject to a terminal disclaimer.

[21] Appl. No.: 08/800,388

[22] Filed: Feb. 14, 1997

Related U.S. Application Data

[63] Continuation-in-part of application No. 08/648,672, May 16, 1996, Pat. No. 5,628,290.

[30] Foreign Application Priority Data

May 16, 1995 [JP] Japan .................................. 7-141230

[51] Int. Cl.$^7$ .................................................. F02D 41/16
[52] U.S. Cl. ................................................... 123/339.12
[58] Field of Search .............................. 123/305, 339.12

[56] References Cited

U.S. PATENT DOCUMENTS

| | | | |
|---|---|---|---|
| 4,398,514 | 8/1983 | Nakamura | 123/339.12 |
| 4,491,108 | 1/1985 | Hasegawa et al. | 123/339.16 |
| 4,593,663 | 6/1986 | Atago et al. | 123/339.12 |
| 4,721,082 | 1/1988 | Hibino et al. | 123/339.12 |
| 5,209,214 | 5/1993 | Ikuta et al. | 123/698 |

FOREIGN PATENT DOCUMENTS

| | | |
|---|---|---|
| 0281152 A2 | 9/1988 | European Pat. Off. . |
| 2711731 | 5/1995 | France . |
| 579370 | 3/1993 | Japan . |

OTHER PUBLICATIONS

Patent Abstracts of Japan—Abstract for JP60 085233 A, published May 14, 1985; Masatoshi Sugiura.

*Primary Examiner*—Andrew M. Dolinar

[57] ABSTRACT

An idle speed control apparatus includes an electronic control unit connected to sensors and switches for detecting the on-off states of an air conditioner and other devices, throttle opening, engine speed, etc. The electronic control unit selectively drives fuel injection valves for adjusting the injection quantity, air bypass valve for adjusting the suction air amount, and/or EGR valve for adjusting the exhaust gas recirculation rate in accordance with an engine load detected by the sensors and switches, thereby selectively executing air-fuel ratio adjustment, suction air amount adjustment, and/or exhaust gas recirculation rate adjustment as required, giving priority to the air-fuel ratio adjustment and suction air amount adjustment in the order named. Thus, idle speed control to cope with engine load fluctuations can be carried out with stability.

4 Claims, 10 Drawing Sheets

IDLE SPEED CONTROL APPARATUS FOR AN INTERNAL COMBUSTION ENGINE

This application is a continuation-in-part of application Ser. No. 08/648,672 filed on May 16, 1996, now U.S. Pat. No. 5,628,290, the entire contents of which are hereby incorporated by reference.

BACKGROUND OF THE INVENTION

1. Field of the Invention

The present invention relates to an idle speed control apparatus for an internal combustion engine, and more particularly, to an idle speed control apparatus adapted for use with an internal combustion engine provided with a device for recirculating the exhaust gas to the intake or suction system of the engine during idle engine operation, or for use with a cylinder-injection engine adapted to inject the fuel directly into engine cylinders.

2. Description of the Related Art

In order to reduce harmful gas components discharged from fuel-injection spark-ignition internal combustion engines mounted in automobiles and the like, or improve the fuel-efficiency of the engines, various new-type engines (hereinafter referred to as cylinder-injection engines) designed to inject the fuel directly into the combustion chambers thereof have recently been proposed to replace conventional manifold-injection engines where the fuel is injected into the intake manifold thereof.

A cylinder-injection engine is proposed in Jpn. Pat. Appln. KOKAI Publication No. 5-79370, for example, which is so arranged as to inject the fuel at a timing suitable to the engine load and which has the combustion chambers formed into a shape matching the manner of fuel injection. More specifically, according to the proposed cylinder-injection engine, the fuel injection mode is switched depending on the engine load between a first term injection mode where the fuel is injected in the suction stroke and a second term injection mode where the fuel is injected in the compression stroke. During low-load operation, the fuel injection into a cavity formed in the piston is carried out at the final stage of the compression stroke in such a manner that an air-fuel mixture with an air-fuel ratio near the stoichiometric air-fuel ratio is formed locally around the spark plug or in the cavity, whereby a generally lean mixture can be lit up in the cylinder. This permits a reduction in the emission of CO and HC and greatly improved fuel-efficiency for idle or normal operation of the engine. During medium-load operation, the fuel is injected at the beginning of the suction stroke into the cavity so that an air-fuel mixture is collected in the cavity, thereby permitting stable combustion and improved fuel-efficiency. During high-load operation, the fuel is injected outside the cavity in the suction stroke, so as to form an air-fuel mixture with a uniform air-fuel ratio in the combustion chamber so that the fuel can be burned in a quantity equal to that for manifold-injection engines, thereby producing an engine output required at the time of starting and accelerating the engine.

The proposed cylinder-injection engine permits the overall air-fuel ratio to be set at a considerably large value (e.g., 25 to 40) in the second term injection mode. Further, by supplying a large amount of fresh air to the engine through a bypass passage provided bypassing the throttle valve or by effecting EGR for recirculating a large amount of exhaust gas to the engine, lean combustion can be carried out during low-load operation such as idle operation, to thereby reduce the emission of CO and HC and improve the fuel-efficiency for idle or normal operation of the engine.

According to researches and developments by the present inventors, it has been proved that, for engine output adjustment, the overall air-fuel ratio can be set at an appropriate value by adjusting the fuel injection quantity within a range where no misfires take place, while maintaining the fresh intake air amount and the EGR amount constant, or by adjusting the intake air amount and the EGR amount, while maintaining the fuel injection quantity constant.

This indicates that idle speed control can be achieved by adjusting the fuel injection quantity in the second term injection mode, without making an intake air amount adjustment, thereby attaining improved response in idle speed control, in addition to improved emission and fuel-efficiency characteristics.

However, it has been proved by the present inventors that the idle speed control including a fuel injection quantity adjustment effected in the second term injection mode entails a drawback that the idle speed becomes unstable or smoke is caused when the air-fuel ratio reaches the limit above which a rich accidental fire (a misfire caused by excessively fuel-rich mixture) takes place if the fuel injection quantity is simply increased with the increase in engine load.

The method of increasing and decreasing the fuel injection quantity so as to control the idle speed can also be realized in the manifold-injection engines. There is a possibility of realizing such idle speed control in a lean-burn engine which is designed to monitor the actual air-fuel ratio with use of a so-called linear air-fuel sensor, or monitor a variation in engine rotation to thereby permit the air-fuel ratio to be set at a value (e.g., 22 to 24) on the fuel-lean side with respect to the stoichiometric air-fuel ratio.

The idle speed control based on fuel injection quantity adjustment for lean-burn engines or cylinder-injection engines, free from fuel transport delay in the intake manifold, is superior in control response as compared with idle speed control based on bypass air amount adjustment, but poses a problem such that it cannot enjoy a wide control range to cope with load fluctuation during idle operation.

SUMMARY OF THE INVENTION

The object of the present invention is to provide an idle speed control apparatus for an internal combustion engine adapted to recirculate the exhaust gas to the suction system of the engine during idle engine operation, which apparatus has been invented in the course of making attempts to eliminate the aforementioned problems and is capable of achieving stabilized idle operation even if substantial fluctuations of the engine load take place during the idle operation, while enjoying improved emission and fuel-efficiency characteristics of the engine of this kind.

An idle speed control apparatus for an internal combustion engine according to the present invention comprises: operation state detecting means for detecting the operation state of an internal combustion engine; air-fuel ratio setting means for setting a target air-fuel ratio in accordance with the engine operation state detected by the operation state detecting means; air-fuel ratio adjusting means for adjusting the air-fuel ratio of an air-fuel mixture supplied to the internal combustion engine to the target air-fuel ratio set by the air-fuel ratio setting means; suction air amount adjusting means for adjusting the amount of suction air into the internal combustion engine; exhaust gas recirculation rate adjusting means for adjusting the rate of exhaust gas recirculation to a suction system of the internal combustion engine; load detecting means for detecting the engine load;

and control parameter selecting means for selecting at least one control parameter among the air-fuel ratio, suction air amount, and exhaust gas recirculation rate in accordance with the engine load detected by the load detecting means during idle operation of the internal combustion engine. The idle speed control apparatus adjusts the value or values of one or more control parameters, selected by the control parameter selecting means, by using a corresponding one or ones of the air-fuel ratio adjusting means, suction air amount adjusting means, and exhaust gas recirculation rate adjusting means, thereby controlling the idle speed of the internal combustion engine.

According to the idle speed control apparatus of the present invention, the idle speed can be properly controlled by variously combining the air-fuel ratio adjustment, suction air amount adjustment, and exhaust gas recirculation rate adjustment, depending on the engine load, so that stable idle operation can be carried out despite wide fluctuations of the engine load during the idle operation. This idle speed control apparatus is adapted for use with an engine in which the exhaust gas is recirculated in the suction system during the idle operation, especially a lean-burn engine or cylinder-injection spark-ignition internal combustion engine, which should be excellent in exhaust characteristics and fuel-efficiency.

Preferably, the control parameter selecting means selects the air-fuel ratio as the at least one control parameter in preference to the other control parameters. Further preferably, the air-fuel ratio setting means sets a target idle air-fuel ratio in accordance with the engine load detected by the load detecting means when the internal combustion engine is in idle operation; and the control parameter selecting means selects the air-fuel ratio as the at least one control parameter in preference to the other control parameters when the target idle air-fuel ratio set by the air-fuel ratio setting means is within a predetermined air-fuel ratio range in which such idle speed control as to cope with engine load fluctuations can be effected by adjusting the air-fuel ratio only. Preferably, the predetermined air-fuel ratio range is an air-fuel ratio range in which stable combustion is ensured during the idle operation of the internal combustion engine. If the engine load fluctuations can be tackled by only adjusting the air-fuel ratio, according to these preferred arrangements, the idle speed control based on the air-fuel ratio adjustment with high response to the engine load fluctuations can be carried out preferentially, so that the idle operation can be quickly stabilized when the engine load fluctuates.

Preferably, the control parameter selecting means selects the air-fuel ratio and the suction air amount as the control parameters when the target idle air-fuel ratio set by the air-fuel ratio setting means is outside the predetermined air-fuel ratio range. In case the engine load fluctuations may not be able to be tackled by only adjusting the air-fuel ratio, according to this preferred arrangement, the problem can be solved beforehand by adjusting the suction air amount. If there is a possibility of a rich accidental fire taking place due to excessive air-fuel ratio adjustment or the like, stable idle operation can be maintained by adjusting the suction air amount while regulating the air-fuel ratio adjustment.

Further preferably, the suction air amount adjusting means includes suction air amount setting means for setting a target suction air amount in accordance with the engine load detected by the load detecting means, and adjusts the suction air amount to the target suction rate. According to this preferred arrangement, the suction air amount adjustment can be made appropriately depending on the engine load.

Further preferably, the suction air amount setting means fixedly sets the target suction air amount when the engine load detected by the load detecting means is within a predetermined engine load range corresponding to the predetermined air-fuel ratio range, and variably sets the target suction air amount for stepped variation when the target idle air-fuel ratio set by the air-fuel ratio setting means is outside the predetermined air-fuel ratio range. If the engine load fluctuations can be tackled by only adjusting the air-fuel ratio, according to this preferred arrangement, the idle operation can be stabilized by supplying the internal combustion engine with a suitable quantity of suction air for the maintenance of the idle operation. In case the engine load fluctuations may not be able to be tackled by only adjusting the air-fuel ratio, moreover, the problem can be solved beforehand to ensure stable idle operation by adjusting the suction air amount.

Further preferably, the control parameter selecting means selects the air-fuel ratio, suction rate, and exhaust gas recirculation rate as the control parameters when the target suction air amount set by the suction rate setting means reaches a maximum suction air amount above which the suction air amount adjusting means is prohibited from further making a suction air amount adjustment for increase. In case the engine load fluctuations may not be able to be tackled by only adjusting the air-fuel ratio and the suction air amount, according to this preferred arrangement, the problem can be solved beforehand to ensure stable idle operation by adjusting the exhaust gas recirculation rate.

Further preferably, the exhaust gas recirculation rate adjusting means includes exhaust gas recirculation rate setting means for setting a target exhaust gas recirculation rate in accordance with the engine load, and adjusts the exhaust gas recirculation rate to the target exhaust gas recirculation rate. According to this preferred arrangement, the exhaust gas recirculation rate adjustment can be made appropriately depending on the engine load.

Further preferably, the exhaust gas recirculation rate setting means fixedly sets the target exhaust gas recirculation rate when the engine load detected by the load detecting means is equal to or smaller than a predetermined load, and sets the target exhaust gas recirculation rate so that the target exhaust gas recirculation rate decreases as the engine load increases when the engine load is greater than the predetermined load. If the engine load is not greater than the predetermined load, according to this preferred arrangement, the emission of NOx can be reduced by recirculating a suitable quantity of exhaust gas in the internal combustion engine. The recirculation of the exhaust gas is particularly serviceable in the case where the NOx purifying effect of a three-way catalyst is lowered as the air-fuel mixture becomes leaner. When the engine load exceeds the predetermined load, the idle operation can be stabilized by reducing the exhaust gas recirculation rate to increase the suction air amount correspondingly.

Preferably, the air-fuel ratio setting means sets the target idle air-fuel ratio at a value equal to or greater than the lower limit value of the predetermined air-fuel ratio range. According to this preferred arrangement, the occurrence of an accidental fire attributable to excessive enrichment of the air-fuel ratio can be prevented.

Preferably, in the arrangement in which the air-fuel ratio is selected preferentially as the at least one control parameter when the target idle air-fuel ratio is within the predetermined air-fuel ratio range, the suction air amount adjusting means adjusts the suction air amount so that the suction air amount is kept constant, and the exhaust gas recirculation rate adjusting means adjusts the exhaust gas recirculation rate so that the exhaust gas recirculation rate is kept constant. If the engine load fluctuations can be tackled by only adjusting the air-fuel ratio, according to this preferred arrangement, the internal combustion engine can be supplied with an effective quantity of suction air for the maintenance of stable idle operation and an effective quantity of exhaust gas for the reduction of the NOx emission, whereby the stability of the idle operation and the emission characteristics of the engine can be improved.

Further preferably, the control parameter selecting means selects the air-fuel ratio and the suction air amount as the control parameters when the target idle air-fuel ratio set by the air-fuel ratio setting means is outside the predetermined air-fuel ratio range. According to this preferred arrangement, the engine load fluctuations can be tackled by adjusting the air-fuel ratio and the suction air amount, whereby the stability of the idle operation can be improved.

Preferably, the suction air amount adjusting means includes suction rate setting means for setting a target suction air amount in accordance with the engine load detected by the load detecting means, and adjusts the suction air amount to the target suction air amount. The control parameter selecting means selects the air-fuel ratio, suction air amount, and exhaust gas recirculation rate as the control parameters when the target idle air-fuel ratio set by the air-fuel ratio setting means reaches the lower limit value of the predetermined air-fuel ratio range, and when the target suction air amount set by the suction rate setting means reaches a maximum suction air amount above which the suction air amount adjusting means is prohibited from further making a suction air amount adjustment for increase. According to this preferred arrangement, the suction air amount adjustment can be made appropriately depending on the engine load, and the engine load fluctuations can be tackled by adjusting the air-fuel ratio, suction air amount, and exhaust gas recirculation rate, whereby stable idle operation can be maintained.

Preferably, according to the present invention, the load detecting means includes load estimating means for calculating a virtual load indicative of a fluctuating load of the internal combustion engine, the fluctuating load being variable during the idle operation of the engine. According to this preferred arrangement, the real value of the fluctuating load, which varies every moment during the idle operation, can be estimated, so that the idle speed control can be carried out appropriately.

Further preferably, the air-fuel ratio setting means sets the target idle air-fuel ratio in accordance with the virtual load calculated by the load estimating means; and the control parameter selecting means selects the air-fuel ratio as the at least one control parameter when the virtual load is equal to or smaller than a first predetermined virtual load corresponding to the lower limit value of a predetermined air-fuel ratio range in which such idle speed control as to cope with engine load fluctuations can be effected by adjusting the air-fuel ratio only. According to this preferred arrangement, the air-fuel ratio adjustment can be made appropriately depending on the fluctuating load. If the engine load fluctuations can be tackled by only adjusting the air-fuel ratio, moreover, the idle speed control based on the air-fuel ratio adjustment with high response to the engine load fluctuations can be carried out preferentially, so that the idle operation can be quickly stabilized when the engine load fluctuates.

Further preferably, the control parameter selecting means selects the air-fuel ratio and the suction air amount as the control parameters when the virtual load is greater than the first predetermined virtual load; and the suction air amount adjusting means includes suction air amount setting means for setting a target suction air amount in accordance with the virtual load, and adjusts the suction air amount to the target suction air amount. According to this preferred arrangement, the engine load fluctuations can be tackled by adjusting the air-fuel ratio and the suction air amount, whereby the idle operation can be stabilized.

Further preferably, the control parameter selecting means selects the air-fuel ratio, suction air amount, and exhaust gas recirculation rate as the control parameter when the target idle air-fuel ratio set by the air-fuel ratio setting means reaches the lower limit value of the predetermined air-fuel ratio range, and when the target suction air amount set by the suction air amount setting means reaches a maximum suction air amount above which the suction air amount adjusting means is prohibited from further making a suction air amount adjustment for increase, so that the virtual load exceeds a second predetermined virtual load which is greater than the first predetermined virtual load. According to this preferred arrangement, the engine load fluctuations can be tackled by adjusting the air-fuel ratio, suction air amount, and exhaust gas recirculation rate, whereby stable idle operation can be maintained.

Preferably, in the idle speed control apparatus comprising the load estimating means, the calculation of the virtual load by the load estimating means is executed repeatedly, and the load estimating means calculates a last virtual load according to a before-last virtual load calculated in the preceding cycle and a load correction value indicative of engine load fluctuations during the time interval between the preceding calculation and the last calculation. According to this preferred arrangement, the virtual load can be calculated accurately.

Further preferably, the internal combustion engine is furnished with auxiliaries adapted to vary the engine speed when actuated. The load detecting means includes expected load detecting means for detecting the respective operating and nonoperating states of the auxiliaries and speed detecting means for detecting the engine speed. The load estimating means includes load correction value setting means for setting a load correction value; and the load correction value setting means sets, as the load correction value, a predetermined value, indicative of a load newly applied to the internal combustion engine as any of the auxiliaries are actuated, when the shift of the operation state of any of the auxiliaries from the nonoperating state to the operating state is detected by the expected load detecting means, and sets the load correction value in accordance with the engine speed detected by the speed detecting means when no shift to the operating state is detected for any of the auxiliaries. According to this preferred arrangement, the virtual load, which is indicative of the fluctuating load attributable to the operation of the auxiliaries or other factors, can be calculated accurately.

Further preferably, the idle speed is subjected to open-loop effected in accordance with the load newly applied to the internal combustion engine as any of the auxiliaries are actuated, when the shift of the operation state of any of the auxiliaries from the nonoperating state to the operating state is detected by the expected load detecting means, and is subjected to feedback control effected in accordance with the engine speed detected by the speed detecting means, when no shift to the operating state is detected for any of the auxiliaries. Further preferably, the feedback control of the idle speed, based on the engine speed detected by the speed detecting means for a predetermined time period, is prohibited when the shift of the operation state of any of the auxiliaries from the nonoperating state to the operating state is detected by the expected load detecting means. Further preferably, the load correction value setting means compares the engine speed detected by the speed detecting means and a target idle speed, and sets the load correction value according to the result of the comparison. Alternatively, the load correction value setting means detects the time-based change of the engine speed detected by the speed detecting means, and sets a second load correction value in accordance with the time-based change of the engine speed. The load estimating means uses the second load correction value in place of the load correction value in calculating the virtual load. According to these preferred arrangements, the engine speed fluctuations, which are attributable to the operation of the auxiliaries, can be prevented from exerting bad influences on the idle speed control. When no auxiliaries are actuated, the change of any other fluctuating load than the auxiliaries can be tacked by the idle speed control based on the engine speed that is indicative of load fluctuations attributable to other causes than the operation of the auxiliaries, whereby stable idle operation can be carried out.

Preferably, in the idle speed control apparatus comprising the load estimating means, the air-fuel ratio setting means sets, as the target air-fuel ratio, an air-fuel ratio read from a virtual load/air-fuel ratio map in accordance with the virtual load calculated by the load estimating means. The suction air amount adjusting means includes suction air amount setting means for setting, as a target suction air amount, a suction air amount read from a virtual load/suction air amount map in accordance with the virtual load calculated by the load estimating means, and adjusts the suction air amount of the internal combustion engine to the target suction air amount. The exhaust gas recirculation rate adjusting means includes exhaust gas recirculation rate setting means for setting, as a target exhaust gas recirculation rate, an exhaust gas recirculation rate read from a virtual load/exhaust gas recirculation rate map in accordance with the virtual load calculated by the load estimating means, and adjusts the rate of exhaust gas recirculation to the suction system of the internal combustion engine to the target exhaust gas recirculation rate. According to this preferred arrangement, the respective target values of the air-fuel ratio, suction air amount, and exhaust gas recirculation rate can be easily set with use of maps.

Preferably, according to the present invention, the internal combustion engine is a cylinder-injection spark-ignition internal combustion engine so designed as to inject fuel directly into a combustion chamber thereof. Further preferably, the internal combustion engine is operable in a first injection mode in which the fuel is injected mainly in a suction stroke and in a second injection mode in which the fuel is injected mainly in a compression stroke. The idle speed control apparatus further comprises injection mode setting means for setting the injection mode of the internal combustion engine and fuel injection timing adjusting means for adjusting the fuel injection timing in accordance with the injection mode set by the injection mode setting means. The injection mode setting means sets the injection mode at the first injection mode when the engine load detected by the load detecting means is greater than an injection mode setting load, and sets the injection mode at the second injection mode when the detected engine load is equal to or smaller than the injection mode setting load. Further preferably, when an idle operation state of the internal combustion engine is detected by the operation state detecting means, the injection mode setting means sets the injection mode at the second injection mode and the air-fuel ratio setting means sets the target idle air-fuel ratio on the fuel-lean side. According to these preferred arrangements, the cylinder-injection spark-ignition internal combustion engine can fully display or enjoy its excellent exhaust characteristics and fuel-efficiency.

Further preferably, the air-fuel ratio is selected as the at least one control parameter in preference to the other control parameters when the target idle air-fuel ratio set by the air-fuel ratio setting means is within a predetermined air-fuel ratio range in which such idle speed control as to cope with engine load fluctuations can be effected by adjusting the air-fuel ratio only. The predetermined air-fuel ratio range is an air-fuel ratio range in which stable combustion is ensured during the idle operation of the internal combustion engine effected by supplying a lean air-fuel mixture to the engine by fuel injection in the second injection mode. If the engine load fluctuations can be tackled by only adjusting the air-fuel ratio, according to this preferred arrangement, the idle speed control based on the air-fuel ratio adjustment with high response to the engine load fluctuations can be carried out preferentially, so that the idle operation can be quickly stabilized when the engine load fluctuates.

Preferably, in the idle speed control apparatus comprising the injection mode setting means, the operation state detecting means includes temperature detecting means for detecting the engine temperature. The injection mode setting means sets the injection mode at the first injection mode when the engine temperature detected by the temperature detecting means and the engine load exceed a set temperature and the injection mode setting load, respectively, or when the detected engine temperature is equal to or lower than the set temperature, and sets the injection mode at the second injection mode when the detected engine temperature is higher than the set temperature and the engine load is equal to or smaller than the injection mode setting load. According to this preferred arrangement, the injection mode can be selected in accordance with the engine temperature and load, so that the idle operation can be stabilized.

Further preferably, the control parameter selecting means selects the suction air amount as the at least one control parameter in preference to the other control parameters when the engine temperature detected by the temperature detecting means is equal to or lower than the set temperature, and the target air-fuel ratio setting means fixedly sets the target idle air-fuel ratio. According to this preferred arrangement, the idle operation with the internal combustion engine in a cold state can be maintained by adjusting the suction air amount, so that the idle operation can be carried out with stability.

Further preferably, the suction air amount adjusting means includes first and second bypass lines, bypassing a throttle valve in the internal combustion engine and communicating with a suction passage of the engine, and first and second on-off control valves provided in the first and second bypass lines, respectively. According to this preferred arrangement, the suction air amount can be adjusted accurately. For example, the suction air amount can be subjected to fine and rough adjustments as required by using the first and second bypass lines with different flow areas.

The idle speed control apparatus may comprises control parameter selecting means for selecting two control parameters among the air-fuel ratio, the suction air amount, and the exhaust gas recirculation rate in accordance with the engine load detected by said load detecting means during idle operation of the internal combustion engine, such that the two control parameters include the air-fuel ratio and either one of the suction air amount and the exhaust gas recirculation rate. In this case, the idle speed control apparatus adjusts values of the two control parameters, selected by the control parameter selecting means, by using said air-fuel ratio adjusting means and a corresponding one of said suction air amount adjusting means and said exhaust gas recirculation rate adjusting means, thereby controlling an idle speed of the internal combustion engine. This makes it possible to combine the air-fuel ratio adjustment and either one of the suction air amount adjustment and the exhaust gas recirculation rate adjustment, depending on the engine load, so as to carry out stable idle operation despite wide fluctuations of the engine load during the idle operation.

The above and other objects, features, and advantages of the invention will be more apparent from the ensuing detailed description taken in connection with the accompanying drawings.

DETAILED DESCRIPTION OF THE INVENTION

An idle speed control apparatus according to one embodiment of the present invention and an internal combustion engine used therewith will now be described with reference to the accompanying drawings.

Figure 1:
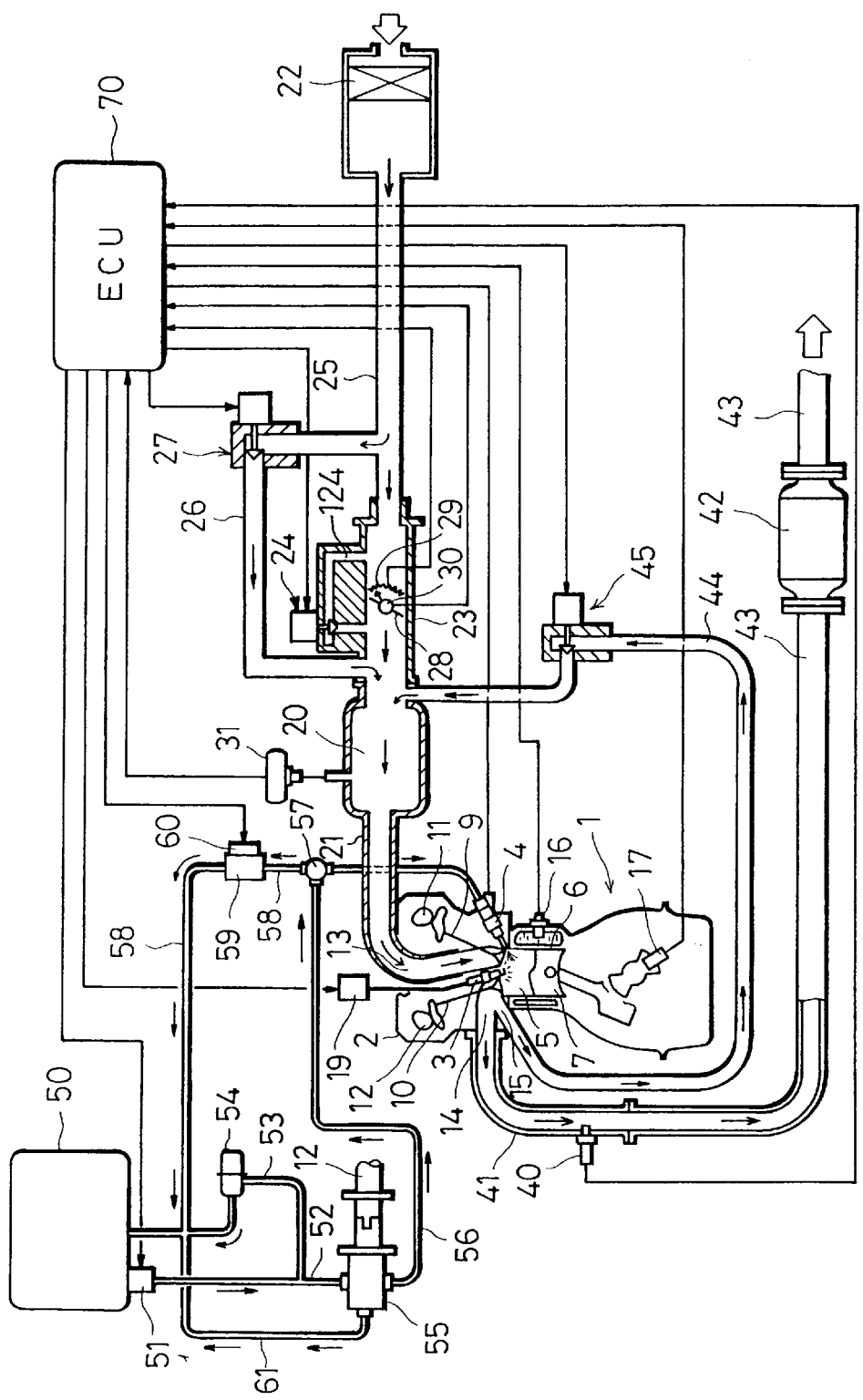
FIG. 1 is a schematic view showing one embodiment of an engine control apparatus according to the present invention.
Figure 2:
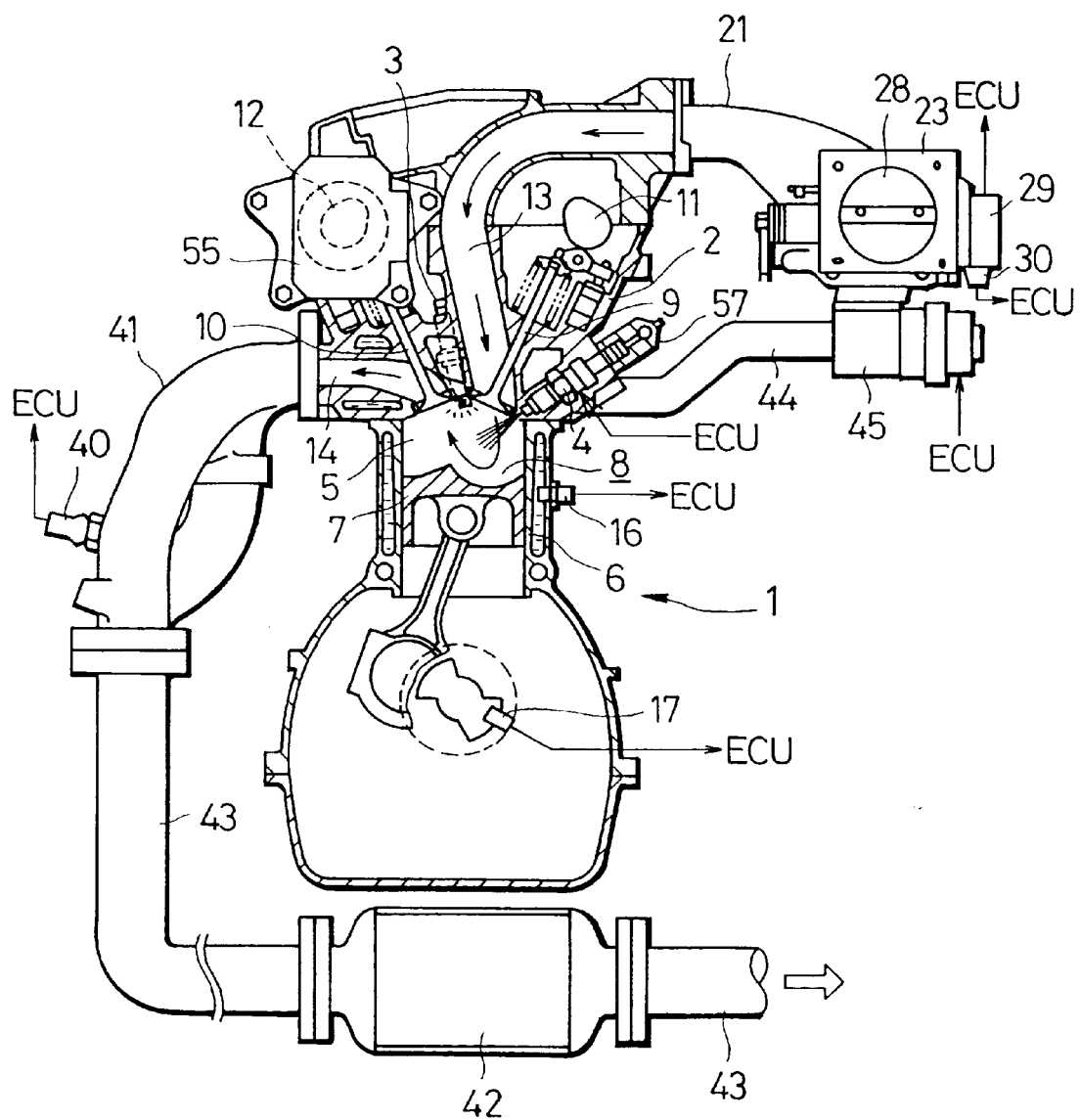
FIG. 2 is a vertical sectional view of a cylinder-injection gasoline engine according to the embodiment.

In FIGS. 1 and 2, numeral 1 denotes a straight-type cylinder-injection four-cylindered gasoline engine (hereinafter referred to simply as engine) for automobile, whose combustion chamber, suction system, EGR system, etc. are designed exclusively for cylinder injection.

In the present embodiment, a cylinder head 2 of the engine 1 is fitted with a solenoid-operated fuel injection valve 4, as well as a spark plug 3, for each cylinder, so that a fuel is injected directly into combustion chambers 5. As shown in FIG. 2, a hemispherical cavity 8 is formed in the top face of a piston 7, which reciprocates sliding in a cylinder 6, in a position that is reached by a fuel spray from the fuel injection valve 4 when the piston is at or near its top dead center. The compression ratio of the engine 1 is adjusted to a higher level (about 12 according to the present embodiment) than that of a manifold-injection engine. A DOHC four-valve system is used as a valve driving mechanism. A suction-side camshaft 11 and an exhaust-side camshaft 12 are rotatably held in the upper portion of the cylinder head 2, in order to drive suction valves 9 and exhaust valves 10, respectively.

The cylinder head 2 is formed with suction ports 13, which extend substantially upright between the two camshafts 11 and 12, so that suction air currents having passed through the suction ports 13 generate reverse tumbling flows (mentioned later) in the combustion chamber 5.

As for an exhaust port 14, like that of a conventional engine, it extends substantially in the horizontal direction, while a large-diameter EGR port 15 (not shown in FIG. 2) diverges diagonally from the port 14. Referring to FIGS. 1 and 2, numerals 16 and 17 denote a water temperature sensor (engine temperature sensor) for detecting a cooling water temperature TW and a crank angle sensor, which outputs a crank angle signal SGT in predetermined crank positions (5° BTDC and 75° BTDC according to the present embodiment) for each cylinder, respectively. In FIG. 1, numeral 19 denotes an ignition coil, which delivers high voltage to the spark plug 3. One of the camshafts which rotate at half the speed of the crankshaft, is fitted with a cylinder discriminating sensor (not shown) for outputting a cylinder discriminating signal SGC, whereby the cylinder for which the crank angle signal SGT is outputted is discriminated.

The suction ports 13 are connected with a suction pipe 25 through a suction manifold 21, which has a surge tank 20. The suction pipe 25 is provided with an air cleaner 22, a throttle body 23, and an ISCV (idle speed control valve) 24 of a stepper-motor type. Also, the suction pipe 25 is connected in parallel with a large-diameter air bypass pipe 26 through which suction air is introduced into the suction manifold 21, bypassing the throttle body 23. The pipe 26 is provided with a large-sized ABV (air bypass valve) 27 of a linear-solenoid type. The air bypass pipe 26 has a flow area substantially equal to that of the suction pipe 25. When the ABV 27 is fully open, a required quantity of suction air for a low or medium speed zone of the engine 1 can flow through the pipe 26. On the other hand, the ISCV 24 has a flow area smaller than that of the ABV 27, and is used in accurately adjusting the suction air amount. Numeral 124 denotes a bypass line that is fitted with the ISCV 24.

The throttle body 23 is provided with a butterfly-type throttle valve 28 for opening and closing the passage, and besides, a throttle sensor 29 for detecting an opening $\theta_{TH}$ of the valve 28 and an idle switch 30 for detecting a fully-closed state of the throttle valve. In FIG. 1, numeral 31 denotes a MAP (manifold absolute pressure) sensor for detecting a suction pipe pressure Pb, which sensor is connected to the surge tank 20.

On the other hand, the exhaust port 14 is connected with an exhaust pipe 43, which is provided with a three-way catalyst 42, muffler (not shown), etc., through an exhaust manifold 41, which is fitted with an $O_2$ sensor 40. The EGR port 15 is connected to the downstream side of the throttle valve 28 and the upstream side of the suction manifold 21 through a large-diameter EGR pipe 44, and its line is provided with an EGR valve 45 of a stepper-motor type.

A fuel tank 50 is set in the rear portion of a vehicle body (not shown). The fuel stored in the fuel tank 50 is sucked up by means of a motor-operated low-pressure fuel pump 5 1, and is supplied to the engine 1 through a low-pressure feed pipe 52. The fuel pressure in the feed pipe 52 is adjusted to a relatively low pressure (3.0 $kg/mm^2$ according to the present embodiment; hereinafter referred to as low fuel pressure) by means of a first fuel pressure regulator 54, which is inserted in a return pipe 53. The fuel supplied to the engine 1 side is fed into each fuel injection valve 4 through a high-pressure feed pipe 56 and a delivery pipe 57 by means of a high-pressure fuel pump 55, which is attached to the cylinder head 2. In the present embodiment, the fuel pump 55 is of a swash-plate axial-piston type, and is driven by the exhaust-side camshaft 12. The pump 55 produces a discharge pressure of 50 $kg/mm^2$ for more even when the engine 1 is in idle operation. The fuel pressure in the delivery pipe 57 is adjusted to a relatively high pressure (50 $kg/mm^2$ according to the present embodiment; hereinafter referred to as high fuel pressure) by means of a second fuel pressure regulator 59, which is inserted in a return pipe 58. In FIG. 1, numeral 60 denotes an electromagnetically-operated fuel pressure selector valve that is attached to the second fuel pressure regulator 59. When the valve 60 is turned on, it relieves the fuel, thereby lowering the fuel pressure in the delivery pipe 57 to a predetermined level (3.g., 3.0 $kg/mm^2$). Numeral 61 denotes a return pipe through which the fuel is returned to the fuel tank 50 after it is used to lubricate or cool the high-pressure fuel pump 55.

An ECU (electronic control unit) 70, which is set in a cabin, is furnished with an input-output unit, storage units (ROM, RAM, nonvolatile RAM, etc.) used to store control programs, control maps, etc., CPU (central processing unit), timer counter (not shown), etc., and serves to control the engine 1 generally.

Figure 10:
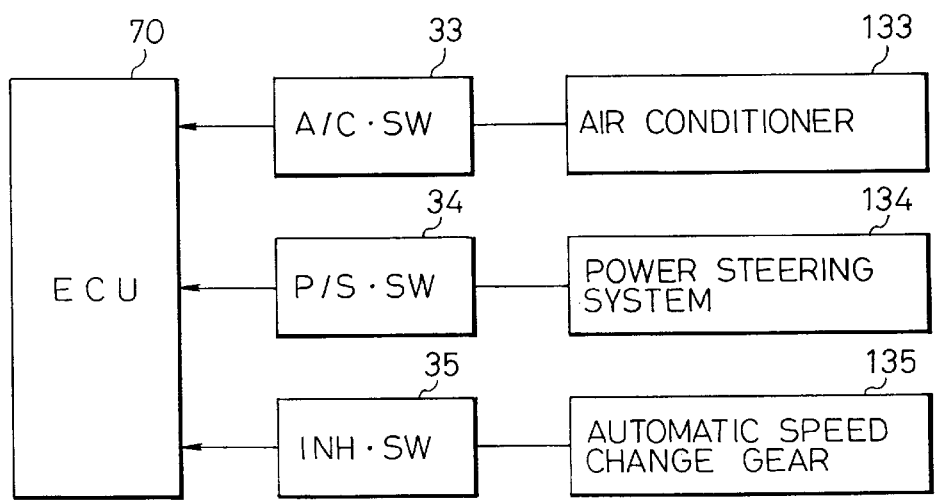
FIG. 10 is a diagram showing an electronic control unit of the engine control apparatus and detecting switches for detecting the operating states of load devices.

The ECU 70 is connected, on its input side, with switches, including an air conditioner switch (A/C·SW) 33, power steering switch (P/S·SW) 34, and inhibitor switch (INH·SW) 35, which serve to detect the operating conditions of an air conditioner 133, power steering system 134, and automatic speed change gear 135, respectively (FIG. 10), which constitute loads on the engine 1 when actuated. Detection signals from these switches are supplied to the ECU 70. Besides the sensors and switches described above, many other switches and sensors (not shown) are connected to the input side of the ECU 70, and various warning lamps and devices are connected to the output side.

In response to input signals from the aforesaid various sensors and switches for use as engine operation state detecting means, the ECU 70 settles a fuel injection mode, injection quantity, ignition timing, EGR gas introduction rate, etc., and drives the fuel injection valve 4, ignition coil 19, EGR valve 45, etc.

As will be mentioned later, the ECU 70 functions as various components (air-fuel ratio setting means, air-fuel ratio adjusting means, control parameter setting means, suction air amount setting means, suction air amount adjusting means, exhaust gas recirculation rate setting means, exhaust gas recirculation rate adjusting means, load detecting means, load estimating means, load correction value setting means, fuel injection timing adjusting means, injection mode setting means, and injection mode selecting means) of the idle speed control apparatus, singly or in conjunction with its corresponding one or more elements.

The basic flow of engine control will now be described in brief.

If a vehicle driver turns on the ignition key when the engine 1 is cold, the ECU 70 switches on the low-pressure fuel pump 51 and the fuel pressure selector valve 60, whereupon the fuel injection valves 4 are supplied with the fuel at low fuel pressure. This is done because when the engine 1 is nonoperating or being cranked, the high-pressure fuel pump 55 does not operate at all or operates only imperfectly, so that the injection quantity must inevitably be settled in accordance with the discharge pressure of the low-pressure fuel pump 51 and the valve-opening time of each fuel injection valve 4. When the driver turns the ignition key to start engine operation, the engine 1 is cranked by a self starter (not shown), whereupon fuel injection control by the ECU 70 is initiated. At this point of time, the ECU 70, for use as injection mode selecting means, selects a first term injection mode (first injection mode), whereupon the fuel is injected so that the air-fuel ratio is relatively rich. This is done because an accidental fire or discharge of unburned fuel (HC) is unavoidable if the fuel is injected in a second term injection mode (second injection mode) or compression stroke, since the vaporization rate of the fuel is low when the engine 1 is cold. Since the ECU 70 closes the ABV 27 at the start of the engine, the suction air is fed into the combustion chamber 5 through a gap of the throttle valve 28 or the ISCV 24. The ISCV 24 and the ABV 27 are controlled unitarily by the ECU 70, and their respective openings are settled depending on the required introduction amount of the suction air (bypass air) that bypasses the throttle valve 28.

When the engine 1 starts idle operation after the starting is completed, the high-pressure fuel pump 55 initiates a rated discharge operation, so that the ECU 70 turns off the fuel pressure selector valve 60, and supplies the fuel at high fuel pressure to the fuel injection valves 4. Naturally, in doing this, the injection quantity is settled in accordance with the high fuel pressure and the valve-opening time of each fuel injection valve 4. Until the cooling water temperature $T_W$ reaches a predetermined value, the ECU 70 selects the first term injection mode to inject the fuel, and the ABV 27 continues to be closed, just as at the time of starting. The idle speed control that is based on the variation of the loads of the auxiliaries, such as the air conditioner, is carried out by means of the ISCV 24 (ABV 27 is also opened as required), as in the case of the manifold-injection engine. When the $O_2$ sensor 40 is heated to an active temperature after the execution of predetermined cycles, moreover, the ECU 70 starts air-fuel ratio feedback control in accordance with the output voltage of the sensor 40, and causes the three-way catalyst 42 to remove harmful exhaust gas components. Thus, when the engine 1 is cold, fuel injection control is effected substantially in the same manner as in the case of the manifold-injection engine. Since no fuel drops adhere to the wall surface of the suction pipe 25, however, the response and accuracy of control are high enough.

Figure 3:
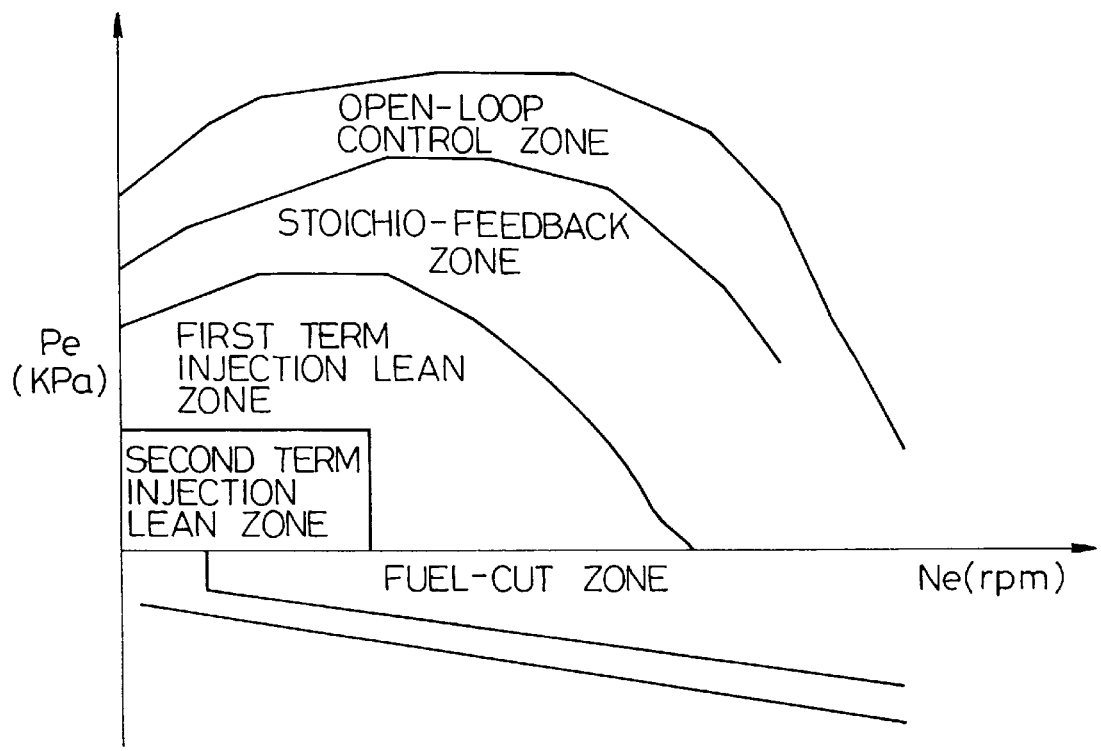
FIG. 3 is a fuel injection control map according to the embodiment, based on an average effective pressure Pe in engine cylinder and engine speed Ne and showing a second term injection lean operation zone, first term injection lean operation zone, first term injection stoichio-feedback operation zone, etc.

When warming up the engine 1 is finished, the ECU 70 retrieves a current fuel injection control region from the fuel injection control map shown in FIG. 3 in accordance with an effective cylinder pressure (target average effective pressure) Pe, which is obtained from the suction pipe pressure Pb, a throttle opening $\theta_{TH}$, etc., and an engine speed Ne, settles the fuel injection mode and the injection quantity, and drives the fuel injection valves 4. Besides, the ECU 70 controls the opening degrees of the ABV 27 and the EGR valve 45.

Figure 4:
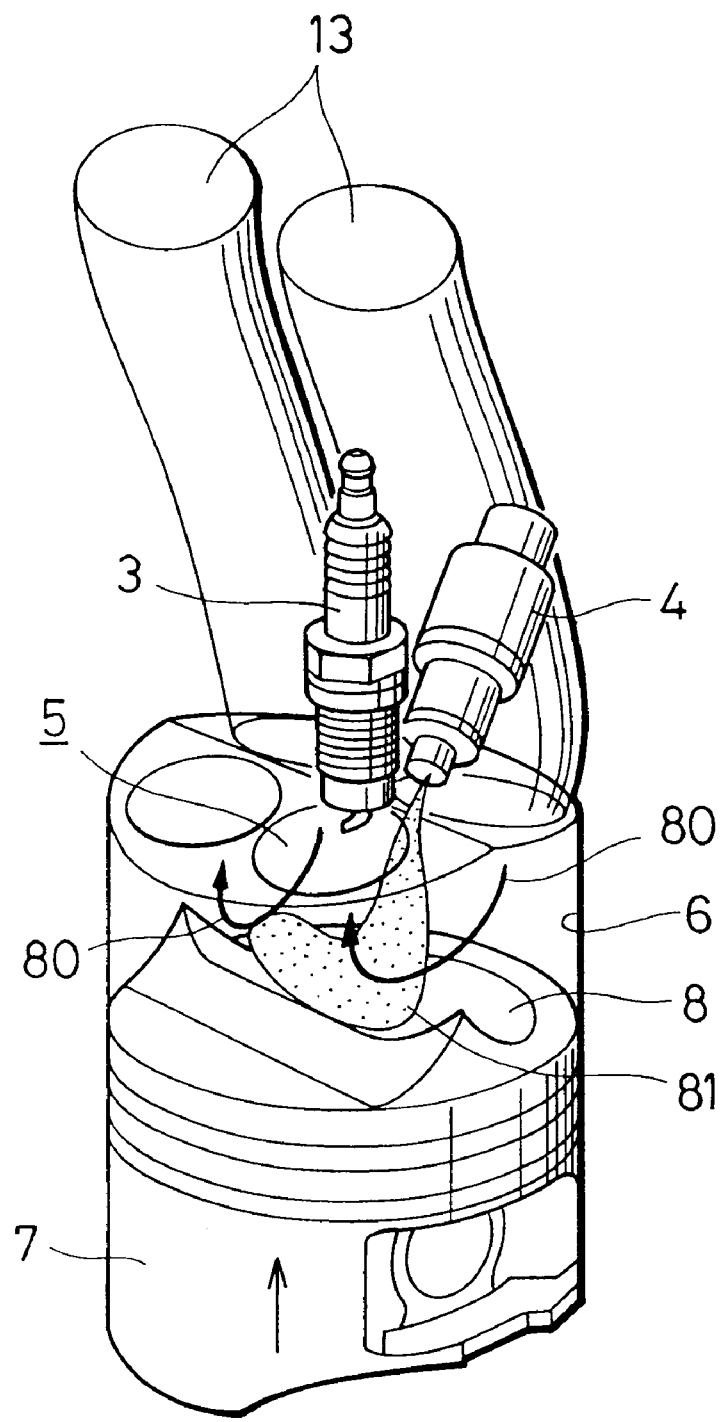
FIG. 4 is a schematic view illustrating the way of fuel injection in a second term injection mode according to the embodiment.

When the engine 1 is in low-load, low-speed operation, such as idle operation, the engine load is lower than a load (injection mode setting load) that is represented by a horizontal boundary line between first term and second term injection lean operation zones shown in FIG. 3, so that the engine 1 is operated in the second term injection lean operation zone. Accordingly, the ECU 70 selects the second term injection mode (also referred to as second term injection lean mode), causes the ABV 27 and the EGR valve 45 to open, depending on the engine operation state, and injects the fuel so that the air-fuel ratio is made lean (about 20 to 40 according to the present embodiment). At this point of time, the vaporization rate of the fuel increases, and the suction air currents introduced through the suction ports 13 generate reverse tumbling flows 80, as indicated by arrows in FIG. 4, so that a fuel spray 81 is kept in the cavity 8 of the piston 7. As a result, an air-fuel mixture of an air-fuel ratio near the stoichiometric air-fuel ratio is formed around the spark plug 3 at the time of ignition, so that the fuel can catch fire even with a very lean general air-fuel ratio (e.g., about 40). Thus, discharge of CO and HC is reduced to very small quantities, and the emission of NOx can be reduced to a low level by a return current of the exhaust gas. Since a pumping loss caused when the ABV 27 and the EGR valve 45 are opened is reduced, moreover, the fuel-efficiency is improved considerably. The control of the idle speed, which corresponds to the variation of the load, is carried out mainly by increasing or decreasing the injection quantity, so that the control response is very high. The idle speed control in the second term injection mode will be described in detail later.

Figure 5:
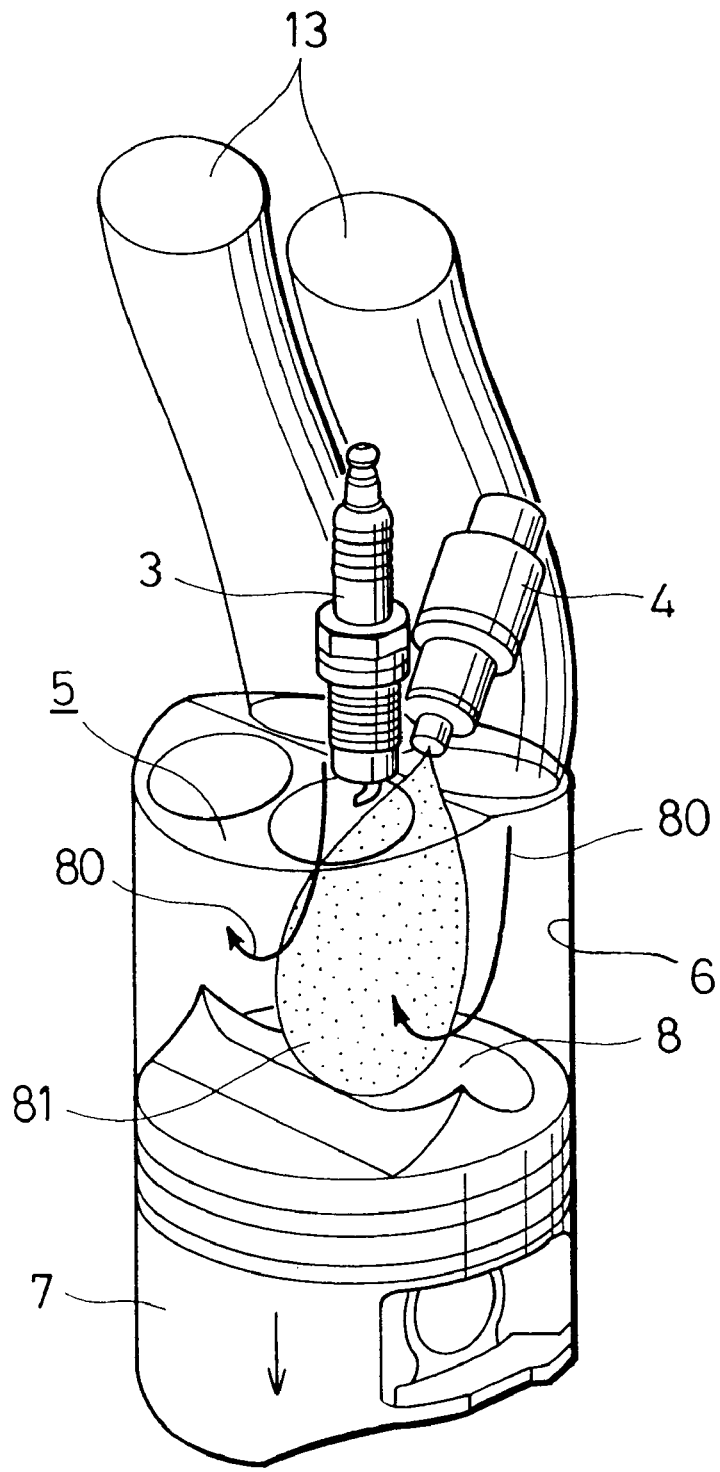
FIG. 5 is a schematic view illustrating the way of fuel injection in a first term injection mode according to the embodiment.

In a low- or medium-speed engine operation, the engine 1 is operated in the first term injection lean operation zone or a stoichio-feedback operation zone (S-F/B zone) shown in FIG. 3, depending on the load state and the engine speed Ne, the ECU 70 selects the first term injection mode, and injects the fuel so as to attain a predetermined air-fuel ratio. Thus, in the first term injection lean mode, the ECU 70 controls the opening of the ABV 27 and the injection quantity so as to obtain a relatively lean air-fuel ratio (about 20 to 23 according to the present embodiment). In the S-F/B zone, the ECU 70 closes the ABV 27, and carries out air-fuel ratio feedback control in accordance with the output voltage of the $O_2$ sensor 40. Also in this case, the suction air currents introduced through the suction ports 13 form the reverse tumbling flows 80, as shown in FIG. 5. Even in the first term injection lean zone, therefore, the fuel can be lit up with a lean air-fuel ratio, due to a turbulence effect attributable to reverse tumbling, by adjusting the fuel injection beginning or end. Even in the first term injection lean zone, moreover, the ECU 70 opens the EGR valve 45 and introduces a suitable quantity of EGR gas into the combustion chambers 5, thereby greatly reducing the quantity of NOx generated with a lean air-fuel ratio. In the S-F/B zone, a high output can be obtained with a relatively high compression ratio, and the harmful exhaust gas components can be removed by means of the three-way catalyst 42.

In a sudden acceleration engine operation or high-speed engine operation, the engine 1 is operated in an open-loop control zone shown in FIG. 3, so that the ECU 70 selects the first term injection mode, closes the ABV 27, and injects the fuel in accordance with the throttle opening $\theta_{TH}$ and the engine speed Ne so as to attain a relatively rich air-fuel ratio. In doing this, a high output can be obtained due to the effect of inertia, since the suction ports 13 extend substantially upright from the combustion chamber 5, as well as due to the high compression ratio and the reverse tumbling flows 80 formed by the suction air currents.

Since the engine 1 is operated in a fuel-cut zone shown in FIG. 3 when the engine is coasting in a medium- or high-speed range, moreover, the ECU 70 stops the fuel injection entirely. Thereupon, the fuel-efficiency is improved, and the emission of the harmful exhaust gas components is reduced. Fuel-cut operation is suspended immediately when the engine speed Ne falls below the return speed or when the driver steps on the accelerator.

The injection quantity, an opening L$_{EGR}$ of the EGR valve 45, etc. are computed in the following manner every time a predetermined crank angle position of each cylinder is detected.

First, the computation of various variables associated with a valve-opening time T$_{INJ}$ of each fuel injection valve 4 will be described. The ECU 70, for use as air-fuel ratio setting means, calculates the target average effective pressure Pe, which corresponds to the throttle opening $\theta_{TH}$ and the engine speed Ne detected by the throttle sensor 29 and the crank angle sensor 17, from a target average effective pressure map previously stored in one of the storage units. Target average effective pressures Peij corresponding to the driver's desired outputs, which correspond to the throttle opening $\theta_{TH}$ and the engine speed Ne, are plotted on the target average effective pressure map and stored in one of the storage units of the ECU 70. These individual data are values that are set experimentally for target average effective pressure information or data (e.g., net average effective pressure), which can be easily collected in a bench test of the engine. Referring to this map, the ECU 70 calculates the optimum target average effective pressure Pe, which corresponds to the detected throttle opening $\theta_{TH}$ and engine speed Ne, by the conventional four-point interpolation method or the like.

Then, the ECU 70 calculates a volumetric efficiency Ev in accordance with the target average effective pressure Pe, set in the aforesaid manner, and the engine speed Ne. This calculation is also made using a volumetric efficiency map that is prepared for second term injection lean mode control. The values in the volumetric efficiency map are also experimentally set beforehand in accordance with the target average effective pressure Pe and the engine speed Ne, and are stored in the aforesaid storage unit.

The volumetric efficiency Ev obtained in this manner is applied to the following equation F1, whereupon the valve-opening time T$_{INJ}$ of each fuel injection valve 4 is computed.

$$T_{INJ} = K * Pb * Ev * Kaf * (Kwt * Kat * \ldots) * Kg + T_{DEC}, \qquad (F1)$$

where Kaf is an air-fuel ratio correction factor set in accordance with the engine operation state. The factor Kaf is set in accordance with the output voltage of the $O_2$ sensor 40 in the S-F/B mode, and is adjusted to an optimum value in any other mode. In the second term injection lean mode control, Kaf is set as follows:

$$Kaf = (\text{Stoichio-air-fuel ratio})/(\text{Target air-fuel ratio } T2). \qquad (F2)$$

The target air-fuel ratio T2 will be described later.

In equation F1, Pb is a suction pipe pressure (suction line pressure) detected by the MAP sensor 31, and Kwt, Kat, etc. are correction factors set in accordance with an engine water temperature Tw, atmospheric temperature Tat, atmospheric pressure Tap, etc. Kg is a gain correction factor of each injection valve 4, and T$_{DEC}$ is a dead time correction value, which is set in accordance with the target average effective pressure Pe and the engine speed Ne. K is a conversion coefficient (constant) used in converting the fuel quantity into the valve-opening time.

The valve-opening time T$_{INJ}$ calculated in this manner is delivered to an injector driver circuit (not shown) for driving each fuel injection valve 4 with a given timing.

Then, the ECU 70 sets an fuel injection end TEND suited for the currently selected control mode in accordance with the aforementioned target average effective pressure Pe and engine speed Ne. If the fuel injection end for the second term injection lean mode is delayed, a period for fully evaporating the injected fuel spray cannot be secured, so that black smoke may be emitted. If the fuel injection end is too early, in contrast with this, the injected fuel runs against the cylinder wall, so that an optimum air-fuel mixture cannot be formed, possibly causing an accidental fire. The fuel injection end T$_{END}$ is previously experimentally adjusted to an optimum value and mapped for each control mode or depending on whether EGR, etc. is effected or not. The fuel injection end T$_{END}$, which is set in accordance with the target average effective pressure Pe and the like, is further corrected by means of the engine water temperature and the like, and fed to the injector driver circuit. In the injector driver circuit, the fuel injection beginning is computed in the accordance with the fed fuel injection end T$_{END}$ and the valve-opening time T$_{INJ}$. When the computed fuel injection beginning is reached, a driving signal is delivered to the fuel injection valve 4 of the cylinder to be supplied with the fuel for a period corresponding to the valve-opening time T$_{INJ}$.

As for the opening L$_{EGR}$ of the EGR valve 45, a plurality of EGR valve opening maps are prepared beforehand in accordance with the selected position (D or N range) of the speed change gear, with every operation mode in which the exhaust gas is to be recirculated. Also in this case, the valve opening L$_{EGR}$, which corresponds to the aforesaid the target average effective pressure Pe and engine speed Ne, is calculated according to a map for the second term injection lean mode. The valve opening L$_{EGR}$ calculated in this manner is fed to an EGR driver circuit (not shown) after the engine water temperature correction and other corrections are executed, and a valve driving signal corresponding to the valve opening L$_{EGR}$ is delivered to the EGR valve 45.

The following is a detailed description of the sequence of the idle speed control according to the present invention.

Figure 6:
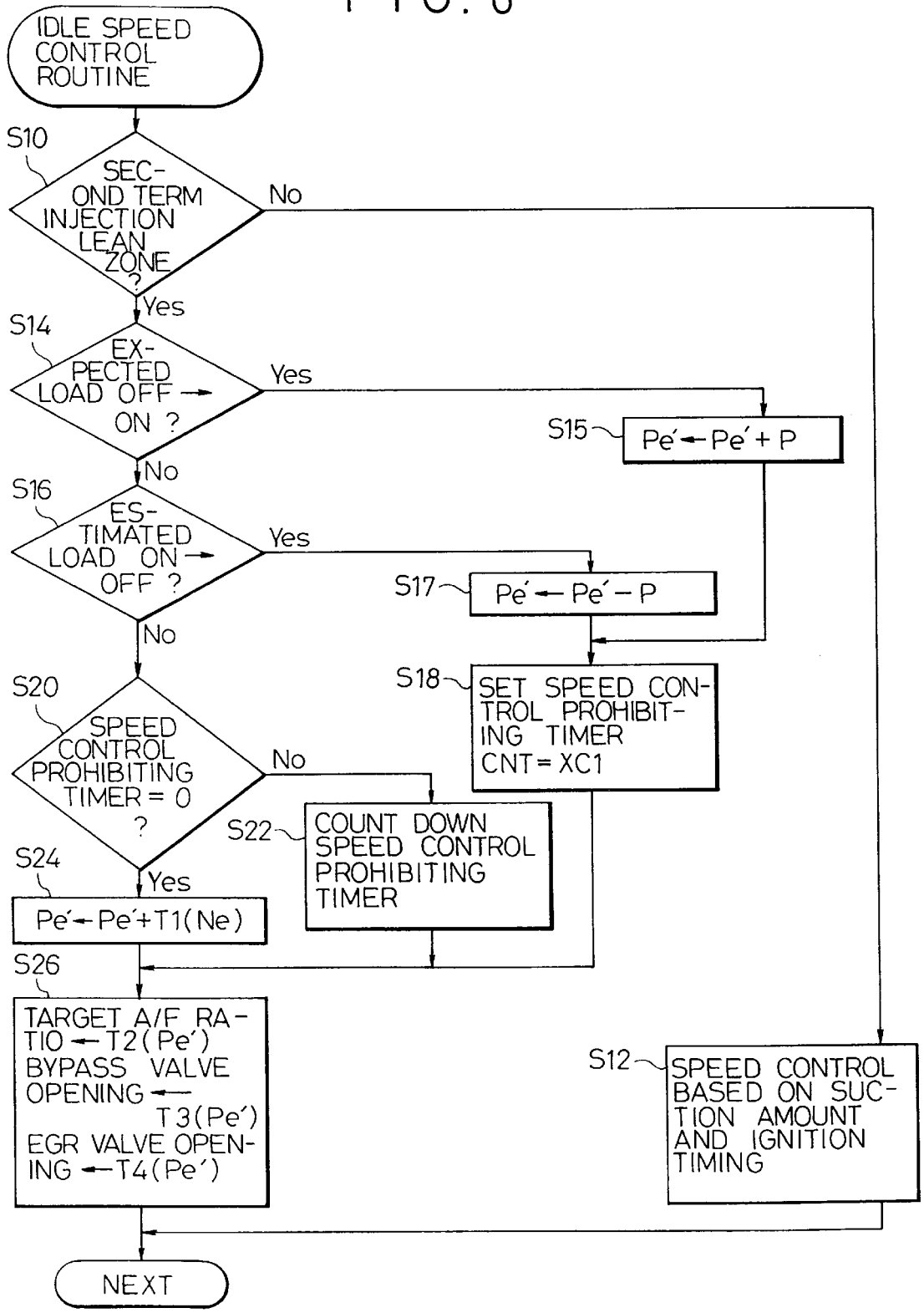
FIG. 6 is a flowchart for illustrating processes, executed every time a predetermined crank angle position of each cylinder is detected, for setting a target air-fuel ratio, bypass valve opening, and EGR valve opening in accordance with the load state of the engine in idle operation, and for controlling the engine speed.

FIG. 6 is a flow chart showing an idle speed control routine that is executed every time the predetermined crank angle position of each cylinder of the engine 1 is detected. In Step S10, the ECU 70 first determines whether or not the engine 1 is in a state such that it is to be operated in the second term injection lean operation zone. If the decision in Step S10 is negative (No), Step S12 is executed for speed control in the first term injection mode. As mentioned before, the speed control in the first term injection mode is carried out when the cooling water temperature T$_W$ is not increased to the predetermined value. While this speed control is not limited to any special method, for example, by or under the control of the ECU 70 which serves as air-fuel ratio setting means, suction air amount setting means, and fuel injection timing adjusting means, the target air-fuel ratio is adjusted to a fixed value (stoichiometric air-fuel ratio, normally), the ISCV 24 (and ABV 27, if necessary) is opened or closed as required to adjust the amount of bypass air introduction in accordance with the deviation between the target idle speed and a real speed, and, if necessary, the ignition timing is adjusted, to thereby control the engine speed Ne in the vicinity of the target idle speed.

If the decision in Step S10 is affirmative (Yes), Step S14 and the subsequent steps are executed to thereby carry out the idle speed control in the second term injection mode according to the present invention.

First, in Steps S14 and S16, the ECU 70, for use as load estimating means, discriminates the change of an expected load. The expected load is a load of a predetermined size that acts on the engine as load devices (e.g., air conditioner 133, power steering system 134, automatic speed change gear 135, etc.) are actuated. The respective operating states of these load devices are detected according to the on-off states of the air conditioner switch (A/C·SW) 33, power steering switch (P/S·SW) 34, and inhibitor switch (INH·SW) 35, individually.

If no change of the load by the load devices is detected for the loop concerned in Steps S14 and S16, both the decisions in these steps are No, and the flow advances to Step S20, whereupon the ECU 70 determines whether or not the value in a speed control prohibiting timer is 0. If the decision in Step S20 is Yes, the program advances to Step S24.

Figure 7:
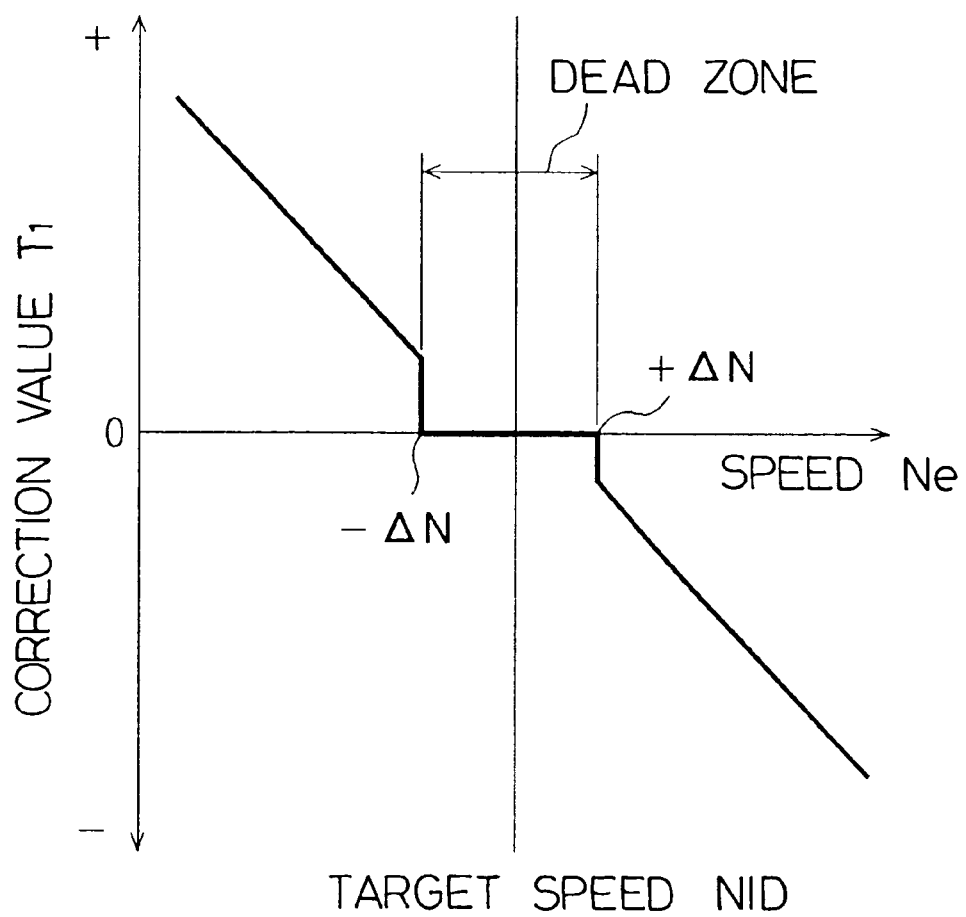
FIG. 7 is a graph showing an example of the relationship between the idling engine speed Ne and a virtual load value Tl(Ne) set in accordance with the engine speed.

In Step S24, a load value (hereinafter referred to as virtual load value) Pe' of the engine 1 detected or estimated for the loop concerned is computed according to the following equation F3.

$$\text{Last virtual load value } Pe' = \text{Before-last virtual load value } Pe' + T1(Ne), \qquad (F3)$$

where T1 (Ne) is a virtual load correction value that is set on the basis of the result of comparison between the real engine speed Ne detected by the crank angle sensor 17 and a target idle speed N$_{ID}$. FIG. 7 shows the relationship between the detected engine speed Ne and the correction value T1 (Ne) set in accordance with the speed Ne. In the case where the real engine speed (idle speed) Ne has a value falling within a dead zone (N$_{ID}$±ΔN) around the target speed N$_{ID}$, the correction value T1 (Ne) is set at 0. In the case where the real idle speed Ne is outside the dead zone and higher than the target speed N$_{ID}$, the correction value is negative. If the real speed Ne is lower than the target speed N$_{ID}$, the correction value is positive.

The correction value T1 (Ne) may be set by various other methods than the aforementioned one. For example, the change of the detected engine speed Ne with elapse of time may be detected so that a correction value (second load correction value) based on the time-based changing rate of the speed can be taken into consideration. This correction can be supposed to be based on the change of the engine load state estimated by the engine speed.

Fluctuations of the idle engine speed (see equation F3), except ones caused by the operation of the load devices, are believed to be attributable to various causes. These causes include, for example, influences of the engine water temperature, oil temperature, atmospheric temperature and pressure, variations in the injection quantity of the fuel injection valves, deterioration of the engine performance with time, etc. These causes can be grasped as changes of the load state (virtual load state) of the idling engine.

The following is a description of a method for setting the virtual load value Pe' for the case in which the fluctuations of the load caused by the operation of the load devices are detected. If one of the aforesaid switches 33, 34 and 35 is turned on so that the decision in Step S14 is Yes, the ECU 70 advances to Step S15, whereupon it computes the last virtual load value Pe' according to the following equation F4.

$$\text{Last virtual load value } Pe' = \text{Before-last virtual load value } Pe'+ P_{LOAD}, \quad (F4)$$

where $P_{LOAD}$ is a predetermined value for the lastly actuated load device set by means of the ECU 70 for use as load correction value setting means. Although two or more load devices can seldom be simultaneously turned on, $P_{LOAD}$ is adjusted to the sum of the respective loads of the devices in such a rare case. The value Pe' in the right side of equation F4 is a before-last virtual load value set in the preceding loop.

In Step S16, on the other hand, the ECU 70 determines whether or not the estimated load is turned off. If any of the load devices are turned off, also in this case, the ECU 70, concluding that the load has changed, advances to Step S17, whereupon it computes the detected or estimated last virtual load value Pe' according to the following equation F5.

$$\text{Last virtual load value } Pe' = \text{Before-last virtual load value } Pe' P_{LOAD}, \quad (F5)$$

where $P_{LOAD}$ is a predetermined value for the lastly de-energized load device. If two or more load devices are simultaneously turned on by any chance, also in this case, $P_{LOAD}$ is adjusted to the sum of the respective loads of the devices.

If the operation of the load devices undergoes is thus changed, the ECU 70 computes the virtual load value Pe' in the aforesaid manner, and advances to Step S18, whereupon it sets the count value CNT in the speed control prohibiting timer at a predetermined value XC1. Then, the flow advances to Step S26, which will be mentioned later. The speed control prohibiting timer serves to prohibit feedback control of the engine speed according to equation F3 for a predetermined period (e.g., 1.5 seconds, corresponding to the predetermined value XC1) so that the idle speed is subjected to open-loop control. During this period, the execution of Step S24 is prohibited. Thus, the speed control prohibiting timer is set every time the fluctuation of the load of any of the load devices is detected. When the routine concerned is executed thereafter, the ECU 70 determines in Step S20 whether or not the count value CNT in the timer is 0. If the count value CNT is not 0, then the speed control prohibiting period is not up yet. In this case, the flow advances to Step S22, whereupon the ECU 70 decrements the count value CNT in the timer by 1, and then the flow advances to Step S26. Thus, if the count value CNT is not 0, the flow skips Step S24 and proceeds to Step S26, so that the feedback control of the engine speed is prohibited during this period.

When the virtual load value Pe' is set in this manner, the ECU 70, which serves as air-fuel ratio setting means, suction air amount setting means, and exhaust gas recirculation rate setting means, computes the target air-fuel ratio T2 (Pe') and the respective target values of an opening (also referred to as bypass opening, corresponding to the amount of bypass air) T3 (Pe') of the bypass valve and an opening (exhaust gas circulation rate) T4 (Pe') of the EGR valve 45 in accordance with the virtual load value Pe', in Step S26. Actually, in the present embodiment, the bypass suction air amount is controlled by the ABV 27 and the ISCV 24, and one or both of these valves are on-off controlled in accordance with the computed value of the valve opening T3(Pe'). In the description to follow, however, the ABV 27 is given as a representative of valve means for adjusting the bypass suction rate.

Figure 8:
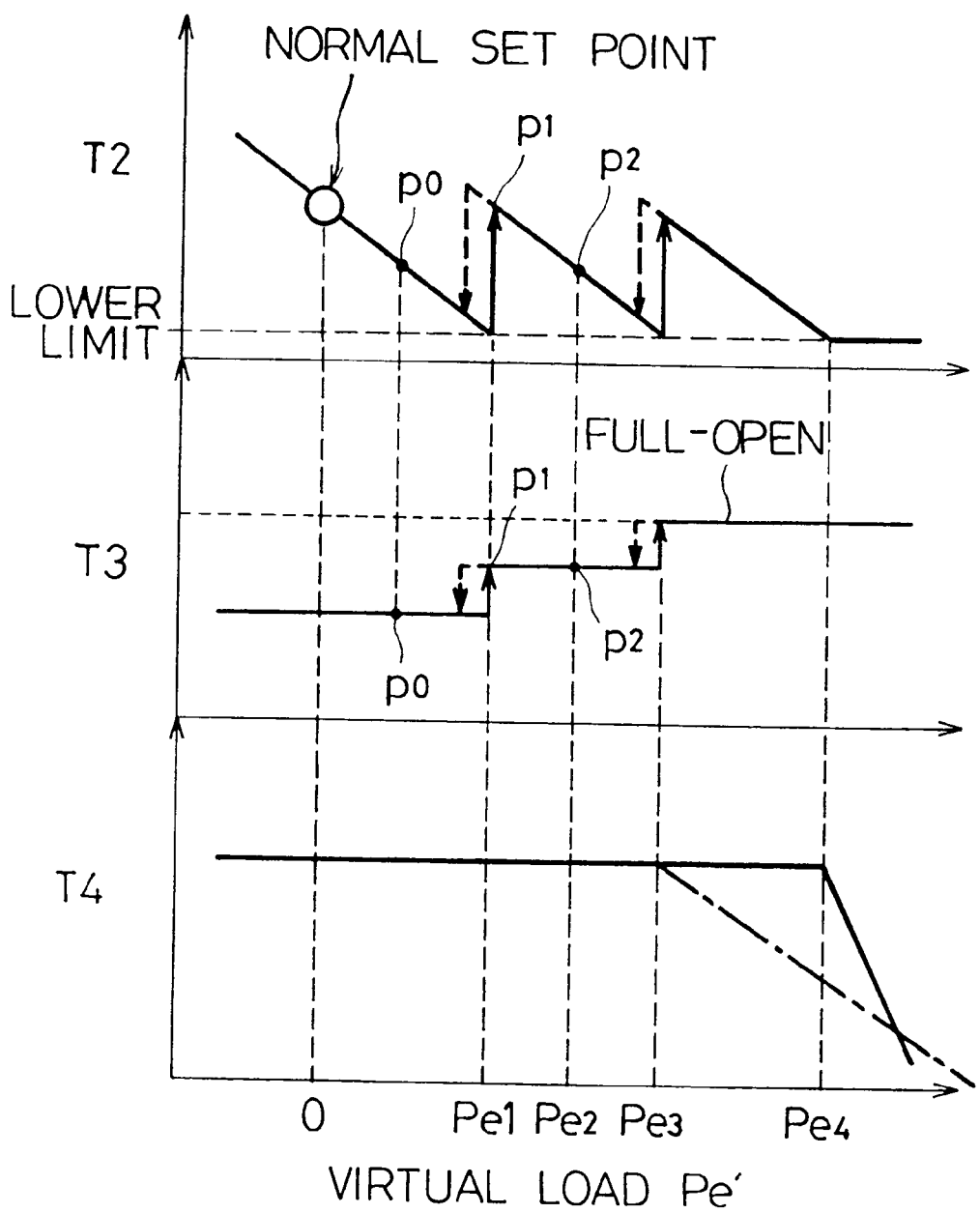
FIG. 8 is a graph showing an example of the relationship between a virtual load value Pe' and a target air-fuel ratio T2, bypass valve opening T3, and EGR valve opening T4 that are set corresponding to the virtual load value.

FIG. 8 typically shows the relationship between the virtual idle load value Pe' and the target air-fuel ratio T2 (Pe'), target bypass opening T3 (Pe'), and target EGR valve opening T4 (Pe') that are set corresponding to the virtual load value Pe'. The storage units of the ECU 70 are loaded with a Pe'-T2 map, Pe'-T3 map, and Pe'-T4 map (virtual load-air-fuel ratio map, virtual load-suction air amount map, and virtual load-exhaust gas recirculation rate map, in general) shown in FIG. 8.

If the virtual load value Pe' is 0 (or if the engine speed Ne is within the dead zone around the target speed $N_{ID}$ with none of the load devices operating, for example), as seen FIG. 8, the target air-fuel ratio T2 (Pe') is set at a normal set point shown in FIG. 8, e.g., 35 according to the present embodiment.

If the engine speed Ne is lowered deviating from the dead zone around the target speed $N_{ID}$ or if any of the load devices are actuated, the virtual load value Pe' increases, so that the target air-fuel ratio T2 (Pe') is set at a value smaller than the value (35) at the normal set point. In the case where the virtual load value Pe' is equal to or smaller than a value Pe1 (first predetermined virtual load) shown in FIG. 8, the bypass opening and the opening of the EGR valve 45 are kept constant. The value Pe1 is set so as to correspond to the lower limit value of a predetermined air-fuel ratio range in which such idle speed control as to cope with the engine load fluctuations can be carried out by only adjusting the injection quantity (air-fuel ratio).

Also, only the target air-fuel ratio is adjusted so that the target air-fuel ratio T2 is set at a value corresponding to the virtual load value Pe'. Thus, in the case where the virtual load value Pe' is within a load range not greater than the value Pe1 (or if the target idle air-fuel ratio is within a predetermined air-fuel ratio range), the idle speed control can be carried out to cope with the engine load fluctuations by only adjusting the injection quantity. Accordingly, the target air-fuel ratio is selected preferentially as a control parameter, and the bypass opening and the EGR valve opening are kept at fixed values suited for the second term injection lean mode control, whereby the engine output is adjusted by only increasing or decreasing the injection quantity.

In the cylinder-injection engine, the fuel is injected directly into the combustion chamber 5, so that the change of the injection quantity quickly shows itself as an output change, although the changes of the bypass suction air amount and the EGR rate are subject to time lags. In view of the engine speed control response, therefore, it is advisable to control the engine speed by adjusting the injection quantity. Thus, priority is given to the engine speed control if it can be carried out by adjusting the target air-fuel ratio. The bypass suction air amout can be increased in proportion to the decrease of the EGR rate. If the air-fuel ratio for the second term injection lean mode is a very large value (20 or more) on the fuel-lean side, however, hardly any NOx purifying effect can be expected from the three-way catalyst 42. Accordingly, the EGR should preferably be effected to avoid bad influences on the NOx emission. It is advisable, therefore, to set control parameters for the engine speed control in the order of priority as follows. The target air-fuel ratio is changed first, and the bypass suction air amount is then changed when the target air-fuel ratio ceases to serve as a control parameter for the speed control. Finally, the EGR rate is changed.

In the second term injection lean mode, the ignition timing is controlled so that spark ignition is carried out at an optimum point of time that the spark plug is reached by the fuel spray, carried by the aforesaid reverse tumbling flows, in the compression stroke. According to the engine of the present embodiment, in contrast with conventional engines, therefore, the idle speed cannot be controlled by adjusting the ignition timing.

Let us suppose a case such that speed fluctuations cause the virtual load value Pe' to increase gradually, for example, to a value Pe2 (working point p2 of FIG. 8), starting from a value (working point p0 of FIG. 8) equal to or smaller than the value Pe1. While this is done, the ECU 70 sets the individual parameter values and controls the engine 1 in the following manner.

First, in the section varying from the working point p0 to a working point at which the virtual load value Pe' corresponding to the value Pe1 is given, the target air-fuel ratio is changed from a value corresponding to the working point p0 to its lower limit value. The lower limit value of the air-fuel ratio is an allowable lower limit value that is set in association with the aforesaid rich accidental fire in the case where the fuel is injected in the second term injection lean mode, and is adjusted to 20, for example. When the target air-fuel ratio T2 reaches this lower limit value, the ECU 70 temporarily keeps the injection quantity at a value set in accordance with the lower limit value, and opens the ABV 27 to a predetermined extent, thereby increasing the bypass suction air amount correspondingly. As this is done, the real air-fuel ratio increases in proportion to the increase of the bypass suction air amount, so that the ECU 70 rewrites the target air-fuel ratio at the resulting value (value corresponding to the working point p 1 of FIG. 8).

When the target air-fuel ratio is rewritten and the bypass suction air amount is stabilized, the engine speed can be controlled by adjusting the air-fuel ratio again. Accordingly, the ECU 70 increases the target air-fuel ratio T2 as the virtual load value Pe' increases, and at the working point p2 where the virtual load value Pe' is at the value Pe2, sets the ratio T2 at a value corresponding to the working point p2. In the section from the working point p1 to the point p2, the bypass opening T3 is kept constant. In the section from the working point p0 to the point p2 of FIG. 8, the opening of the EGR valve 45 is kept constant.

When the virtual load value Pe' further increases to reach the value Pe3, the ABV 27 is opened to an adjustable full-open value. Thus, the engine output can be controlled by adjusting the target air-fuel ratio T2 while the virtual load value Pe' changes from the value Pe3 to the value Pe4. When the virtual load value Pe' reaches the value Pe4, however, the target air-fuel ratio T2 reaches the predetermined lower limit value, so that it is kept at the lower limit value as the virtual load value Pe' increases further. On and after the point of time that the value Pe4, a second predetermined virtual load value, is reached by the virtual load value Pe', the EGR valve 45 is gradually closed as the virtual load value Pe' increases. As this is done, the EGR rate decreases so that the new air suction rate increases, while the target air-fuel ratio is kept constant. Accordingly, the injection quantity and the engine output increase, and the idle speed is kept at its target value.

For the air-fuel ratio adjustment, a hysteresis characteristic is given to stabilize the control, by using different working lines depending on the increasing and decreasing directions of the virtual load value Pe', as indicated by thick broken-lines in FIG. 8.

The method of setting the parameter values may be modified variously without departing from the scope or spirit of the present invention. A parameter setting method shown in FIG. 9 is a control method suited for the case in which the expected load changes substantially when any of the load devices are actuated.

Figure 9:
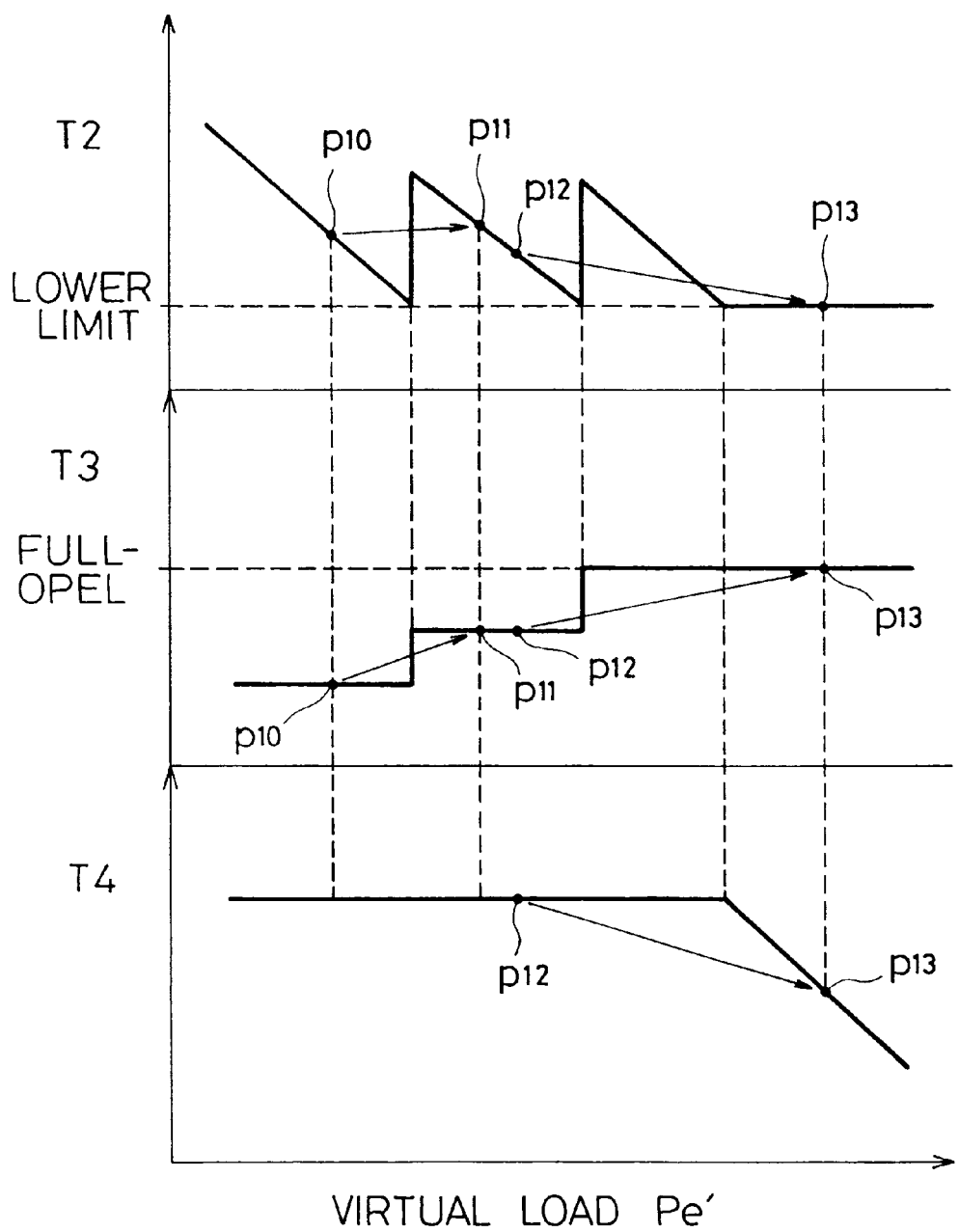
FIG. 9 is a graph showing a modified example of the relationship between the virtual load value Pe' and the target air-fuel ratio T2, bypass valve opening T3, and EGR valve opening T4.

If the air conditioner switch (A/C·SW) 33, for instance, is turned on so that the virtual load value Pe' suddenly changes from a working point p10 to a working point p11, the ECU 70 can enjoy improved control response not by changing the target air-fuel ratio T2 and the bypass suction opening T3 along the working lines shown in FIG. 8, but by changing the two parameters T2 and T3 simultaneously toward their respective target values, which are obtained from the Pe'-T2 and Pe'-T3 maps of FIG. 9, respectively, as indicated by arrows in FIG. 9.

If the virtual load value Pe' undergoes a greater sudden change so that the working point suddenly shifts its position from a point p12 to a point p13, the ECU 70 may change the three parameters T2, T3 and T4 simultaneously toward their respective target values, which are obtained from the Pe'-T2, Pe'-T3, and Pe'-T4 of FIG. 9, respectively, as indicated by arrows in FIG. 9.

In the embodiment described above, the engine speed control by means of the EGR valve 45 is started after an adjustable maximum value is reached by the bypass opening T3 (on and after the point of time that the value Pe4 is exceeded by the virtual load value Pe' shown in FIG. 8), in consideration of influences of the emission characteristics. In some cases, however, bypass opening T3 and the opening T4 of the EGR valve 45 may be adjusted simultaneously as the virtual load value Pe' increases from the point of time that the bypass opening of the ABV 27 reaches a value corresponding to a predetermined load (e.g., virtual load value Pe4), as indicated by thick dashed line in FIG. 8.

According to the embodiment described herein, the present invention is applied to the cylinder-injection spark-ignition internal combustion engine, and the idle speed control is carried out as the engine operates in the second term injection lean mode. However, the invention is not limited to this embodiment, and may be applied to any other engines in which the exhaust gas can be returned during idle speed control. For example, the invention may be also applied to the idle speed control of a manifold-injection lean-burn engine.

In the embodiment, the air-fuel ratio control is first effected, the suction air amount control is secondly effected, and the EGR rate control is thirdly effected. Thus, if a great engine load fluctuation uncontrollable solely by the air-fuel ratio control takes places or if such a great fluctuation is estimated, the suction rate control is carried out in combination with the air-fuel ratio control. However, the present invention is not limited to this. Alternatively, the EGR rate control may be made in combination with the air-fuel ratio control in such an occasion.

What is claimed is:

1. An idle speed control apparatus for an internal combustion engine, comprising:

operation state detecting means for detecting an operation state of the internal combustion engine;

air-fuel ratio setting means for setting a target air-fuel ratio in accordance with the engine operation state detected by said operation state detecting means;

air-fuel ratio adjusting means for adjusting an air-fuel ratio of an air-fuel mixture supplied to the internal combustion engine to the target air-fuel ratio set by said air-fuel ratio setting means;

suction air amount adjusting means for adjusting an amount of suction air into the internal combustion engine;

exhaust gas recirculation rate adjusting means for adjusting a rate of exhaust gas recirculation to a suction system of the internal combustion engine;

load detecting means for detecting an engine load; and control parameter selecting means for selecting at least one control parameter among the air-fuel ratio, the suction air amount, and the exhaust gas recirculation rate in accordance with the engine load detected by said load detecting means during idle operation of the internal combustion engine;

said idle speed control apparatus adjusting a value of said at least one control parameter, selected by said control parameter selecting means, by using a corresponding one or ones of said air-fuel ratio adjusting means, said suction air amount adjusting means, and said exhaust gas recirculation rate adjusting means, thereby controlling an idle speed of the internal combustion engine;

said suction air amount adjusting means including at least one air control valve for changing a flow area of a suction pipe of the engine, and said idle speed control apparatus adjusting the suction air amount by changing an opening degree of the air control valve.

2. An idle speed control apparatus for an internal combustion engine, comprising:

operation state detecting means for detecting an operation state of the internal combustion engine;

air-fuel ratio setting means for setting a target air-fuel ratio in accordance with the engine operation state detected by said operation state detecting means;

air-fuel ratio adjusting means for adjusting an air-fuel ratio of an air-fuel mixture supplied to the internal combustion engine to the target air-fuel ratio set by said air-fuel ratio setting means;

suction air amount adjusting means for adjusting an amount of suction air into the internal combustion engine;

exhaust gas recirculation rate adjusting means for adjusting a rate of exhaust gas recirculation to a suction system of the internal combustion engine;

load detecting means for detecting an engine load; and control parameter selecting means for selecting two control Parameters among the air-fuel ratio, the suction air amount, and the exhaust gas recirculation rate in accordance with the engine load detected by said load detecting means during idle operation of the internal combustion engine, the two control parameters including the air-fuel ratio and either one of the suction air amount and the exhaust gas recirculation rate;

said idle speed control apparatus adjusting a value of the two control parameters. selected by said control parameter selecting means, by using corresponding ones of said air-fuel ratio adjusting means, said suction air amount adjusting means, and said exhaust gas recirculation rate adjusting means, thereby controlling an idle speed of the internal combustion engine; and said suction air amount adjusting means including at least one air control valve for changing a flow area of a suction pipe of the engine, and said idle speed control apparatus adjusting the suction air amount by changing an opening degree of the air control valve.

3. An idle speed control apparatus for an internal combustion engine, comprising:

operation state detecting means for detecting an operation state of the internal combustion engine;

air-fuel ratio setting means for setting a target air-fuel ratio in accordance with the engine operation state detected by said operation state detecting means;

air-fuel ratio adjusting means for adjusting an air-fuel ratio of an air-fuel mixture supplied to the internal combustion engine to the target air-fuel ratio set by said air-fuel ratio setting means;

suction air amount adjusting means for adjusting an amount of suction air into the internal combustion engine;

exhaust gas recirculation rate adjusting means for adjusting a rate of exhaust gas recirculation to a suction system of the internal combustion engine;

load detecting means for detecting an engine load; and control parameter selecting means for selecting at least one control parameter among the air-fuel ratio, the suction air amount, and the exhaust gas recirculation rate in accordance with the engine load detected by said load detecting means during idle operation of the internal combustion engine, said idle speed control apparatus adjusting a value of said at least one control parameter, selected by said control parameter selecting means, by using a corresponding one or ones of said air-fuel ratio adjusting means, said suction air amount adjusting means, and said exhaust gas recirculation rate adjusting means, thereby controlling an idle speed of the internal combustion engine;

said exhaust gas recirculation rate adjusting means including an exhaust gas recirculation valve for changing a flow area of an exhaust gas recirculation passage of the engine, and said idle speed control apparatus adjusting the exhaust gas recirculation rate by changing an opening degree of the exhaust gas recirculation valve.

4. An idle speed control apparatus for an internal combustion engine, comprising:

operation state detecting means for detecting an operation state of the internal combustion engine;

air-fuel ratio setting means for setting a target air-fuel ratio in accordance with the engine operation state detected by said operation state detecting means;

air-fuel ratio adjusting means for adjusting an air-fuel ratio of an air-fuel mixture supplied to the internal combustion engine to the target air-fuel ratio set by said air-fuel ratio setting means;

suction air amount adjusting means for adjusting an amount of suction air into the internal combustion engine;

exhaust gas recirculation rate adjusting means for adjusting a rate of exhaust gas recirculation to a suction system of the internal combustion engine;

load detecting means for detecting an engine load; and control parameter selecting means for selecting two control parameters among the air-fuel ratio, the suction air amount, and the exhaust gas recirculation rate in accordance with the engine load detected by said load detecting means during idle operation of the internal combustion engine, the two control parameters including the air-fuel ratio and either one of the suction air amount and the exhaust gas recirculation rate;

said idle speed control apparatus adjusting a value of the two control parameters, selected by said control parameter selecting means, by using corresponding ones of said air-fuel ratio adjusting means, said suction air amount adjusting means, and said exhaust gas recirculation rate adjusting means, thereby controlling an idle speed of the internal combustion engine; and said exhaust gas recirculation rate adjusting means including an exhaust gas recirculation valve for changing a flow area of an exhaust gas recirculation passage of the engine, and said idle speed control apparatus adjust[s] inq the exhaust gas recirculation rate by changing an opening degree of the exhaust gas recirculation valve.

* * * * *